(12) United States Patent
Kaibel et al.

(10) Patent No.: US 6,427,985 B1
(45) Date of Patent: Aug. 6, 2002

(54) STRUCTURED PACKING FOR HEAT EXCHANGE AND MASS TRANSFER

(75) Inventors: Gerd Kaibel, Lampertheim; Manfred Stroezel, Ilvesheim; Achim Stammer, Freinsheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/625,486

(22) Filed: Jul. 25, 2000

(30) Foreign Application Priority Data

Aug. 3, 1999 (GB) .......................................... 199 36 380

(51) Int. Cl.[7] .................................................. B01F 3/04
(52) U.S. Cl. ............................. 261/112.2; 261/DIG. 72
(58) Field of Search ........................... 261/112.1, 112.2, 261/DIG. 72

(56) References Cited

U.S. PATENT DOCUMENTS

| | | | | |
|---|---|---|---|---|
| 3,374,992 A | * | 3/1968 | Greer | 261/112.2 |
| 4,186,159 A | * | 1/1980 | Huber | 261/DIG. 72 |
| 4,518,544 A | * | 5/1985 | Carter et al. | 261/112.2 |
| 4,732,713 A | * | 3/1988 | Korsell | 261/112.2 |
| 5,124,086 A | * | 6/1992 | Schultz | 261/112.2 |
| 5,147,583 A | * | 9/1992 | Bugler, III et al. | 261/112.2 |
| 5,167,879 A | * | 12/1992 | Streng | 261/112.2 |
| 5,413,872 A | * | 5/1995 | Faigle | 261/112.2 |
| 5,454,988 A | * | 10/1995 | Maeda | 261/112.2 |
| 5,632,934 A | * | 5/1997 | Billingham et al. | 261/112.2 |
| 5,950,454 A | | 9/1999 | Burst et al. | 62/643 |
| 6,101,841 A | * | 8/2000 | Billingham et al. | 261/112.2 |

FOREIGN PATENT DOCUMENTS

| | | | | |
|---|---|---|---|---|
| DE | 2921270 | * | 11/1980 | 261/DIG. 72 |
| DE | 196 05 286 | | 8/1997 | |
| GB | 1402883 | * | 8/1975 | 261/DIG. 72 |
| JP | 47-23162 | * | 6/1972 | 261/112.2 |
| SU | 1183158 | * | 10/1985 | 261/112.2 |
| WO | WO 94/02794 | * | 2/1994 | 261/DIG. 72 |

* cited by examiner

*Primary Examiner*—C. Scott Bushey
(74) *Attorney, Agent, or Firm*—Keil & Weinkauf (57) ABSTRACT

A structured packing for heat exchange and mass transfer between a liquid and a gas in a column having at least one packing layer with a first, lower end and a second, upper end is described, the packing layer having an internal geometry which varies over its height so that by suitably setting the liquid and gas flow rates in a first, in particular lower, region of the packing layer a bubbling layer having a predominantly disperse gas phase forms in a targeted manner and simultaneously in a second, in particular upper, region of the packing layer a film flow of the liquid having a predominantly continuous gas phase forms in a targeted manner.

15 Claims, 10 Drawing Sheets

STRUCTURED PACKING FOR HEAT EXCHANGE AND MASS TRANSFER

The invention relates to a structured packing for heat exchange and mass transfer between a liquid and a gas in a column. For heat exchange and mass transfer between liquid and gaseous media, in particular for the separation of mixtures by distillation, plate columns and packed columns are used in industry. The two types differ with respect to the hydrodynamic operating conditions.

In the case of plate columns, in each case a bubbling layer forms on the individual plates where predominantly the liquid is the continuous phase and the gas the disperse phase. Between the individual plates are free spaces in which predominantly the gas is the continuous phase.

The mode of operation of packed columns differs from plate columns with respect to hydrodynamics. In this case it is not the liquid but the gas which forms the continuous phase. The liquid runs as a film downward over the packings.

Structured packings are made up of a multiplicity of individual layers of packing elements, such as metal sheets, expanded metals and wire fabrics, which are disposed vertically to one another in a regular structure and are usually held together in a composite by attachments such as metal wires, thin metal rods or metal sheet strips. Usually the packing elements themselves have a geometric structuring, for example in the form of folds or circular holes of from about 4 to 6 mm in diameter. The openings act to increase the flood limit of the packing and to make a higher column load possible.

Examples are packings of the types "Mellapak", CY and BX from Sulzer AG, CH-8404 Winterthur, or types A3, BSH or B1 from Montz GmbH, D-40723 Hilden. The folds of the packing elements of these packings run linearly and at an angle of from about 30° to 45° to the longitudinal axis of the packing. The foldings of the packing elements lead to a cross-channel structure within the structured packing.

DE 196 05 286 A1 describes a special development in which this angle is further decreased to values of from 3° to 14° in order to reduce the pressure drop of the packings as far as possible in the case of applications at high vacuum (approximately 1 mbar top pressure).

In the prior art, structured packings are known which are catalytically active. A catalytically active distillation packing in a conventional shaping is, for example, the packing "KATAPAK" from Sulzer AG, CH-8404 Winterthur.

Structured packings are usually provided as individual packing layers which are then arranged in the column stacked one above the other. The packing layers usually have a height of from about 0.17 m to about 0.30 m.

In the prior art, a structured packing called "Montz" A2 from Montz GmbH, D-40723 Hilden is known, which has folded packing elements with curved fold courses. Within a packing element, the gradient of these fold courses varies over the height of the packing element. In this case the layers of the packing elements alternate so that in each case one packing element in which the gradient of the fold line is greatest at the bottom end of the packing layer alternates with a packing element in which the gradient of the fold line is greatest at the top end of the packing layer. The internal geometry of the packing layer is therefore constant over its height. However, this packing type, in comparison with the usual structured packings, has an unfavorable separation efficiency.

Because of the industrial importance of heat exchange and mass transfer processes in chemistry and process engineering, in particular separation by distillation, a multiplicity of technical developments are aimed at improving heat exchange and mass transfer columns, in particular distillation columns. Important criteria for an efficient economic heat exchange and mass transfer column, in particular distillation column, are its price, its throughput performance for the gas and liquid stream and the separation efficiency based on the height of the column. It is usually characterized as the number of theoretical plates per meter of column height ($n_{th}/m$) or as the height equivalent to a theoretical plate (HETP).

It is an object of the present invention to increase the throughput and economic efficiency of heat exchange and mass transfer columns, in particular for distillation purposes.

We have found that this object is achieved by a structured packing for heat exchange and mass transfer between a liquid and a gas in a column having at least one packing layer with a first, lower end and a second, upper end, the packing layer having an internal geometry which varies over its height so that by suitably setting the liquid and gas flow rates in a first, in particular lower, region of the packing layer a bubbling layer having a predominantly disperse gas phase forms in a targeted manner and simultaneously in a second, in particular upper, region of the packing layer a film flow of the liquid having a predominantly continuous gas phase forms in a targeted manner.

The internal geometry is therefore, in contrast to structured packings of the prior art, not constant over the height of the packing layer.

The hydrodynamic operating states described can be achieved by the resistance to flow varying over the height of the packing layer. Preferably the first, optionally lower, region of the packing layer has a higher resistance to flow than the second, optionally upper, region of the packing layer.

The first region of the packing layer is preferably situated in a lower region of the packing layer and the second region of the packing layer is preferably in an upper region of the packing layer. For the purposes of the present invention, the first, optionally lower, region and the second, optionally upper, region of the packing layer preferably extend over the entire cross-sectional area of the packing layer. The first, lower, region of the packing layer can be bound directly to the lower end of the packing layer and the second, upper region of the packing layer can be bound directly to the upper end of the packing layer. In a preferred embodiment, the first, optionally lower, region of the packing layer is connected directly to the second, optionally upper, region.

In the context of the present invention a structured packing is preferred in which the packing layer has touching flat packing elements, in particular metal sheets, expanded metals, wire fabrics and knitted meshes, having folds of defined courses, the fold courses or tangents to the fold courses being at a larger angle to the longitudinal axis of the packing layer in the first region of the packing layer than in the second region of the packing layer. Particularly preferably, the fold courses or the tangents to the fold courses of the packing elements are at an angle of from about 45° to about 75° to the longitudinal axis of the packing layer in the first region of the packing layer and from about 10° to about 45° in the second region. Very particularly preferably, the fold courses or the tangents to the fold courses are at an angle of from about 60° to about 70° to the longitudinal axis of the packing layer in the first region of the packing layer and from about 30° to about 45° in the second region.

The folds can have, at least in sections, a curved or linear course.

In a preferred embodiment, the folds are curved in a shape of monotonic course, so that the tangents to the fold courses are at an angle of from about 45° to about 75°, preferably from about 60° to about 70°, to the longitudinal axis of the packing layer at the lower end of the packing layer, this angle of the tangents to the fold courses decreasing upwardly to values of from about 10° to about 45°, preferably from about 30° to about 45°, to the longitudinal axis of the packing layer.

The structured packing can also be designed such that the fold courses are linear in sections, the fold courses preferably being at an angle of from about 45° to about 75°, particularly preferably from about 60° to 70° to the longitudinal axis of the packing layer in the first region of the packing layer and the angle of the fold courses to the longitudinal axis of the packing layer decreasing upwardly in one step or in a plurality of steps to values of, preferably from about 10° to about 45°, particularly preferably from about 30° to about 45°.

The specific surface area of the inventive structured packings is preferably from about 100 to 750 $m^2/m^3$, particularly preferably from 250 to 500 $m^2/m^3$.

The folds in the packing elements can be made with sharp edges or rounded.

The first region of the packing layer preferably has a height of from 0.02 to 0.10 m, more preferably from 0.03 to 0.10 m, and particularly preferably from 0.03 to 0.05 m.

The second region of the packing layer preferably has a height of from 0.1 to 0.3 m, and particularly preferably from 0.15 to 0.2 m.

The packing layers of the inventive structured packing preferably have a height of from 0.05 to 0.40 m, more preferably from 0.08 to 0.35 m or from 0.10 to 0.25 m, and particularly preferably from 0.12 to 0.20 m. The lower height of the packing layer is preferably provided for closely packed packings having a specific surface area of from about 500 to about 750 $m^2/m^3$, the higher value for coarser packings having from about 100 to about 500 $m^2/m^3$.

The liquid load of the structured packing is preferably from about 0.2 to 50 $m^3/m^2h$. At from 70 to 80% of the flood limit, the pressure drop of the inventive packing is preferably from about 2 to 10 mbar/m. The packing elements preferably have a metal sheet thickness of about 0.1 mm.

In a preferred embodiment of the present invention in which the packing layer has packing elements, at least some of the packing elements are bent over in tongue-like manner at the lower end and/or upper end of the packing layer. Preferably, the packing elements have cuts for this at the lower end and/or upper end of the packing layer at defined distances which preferably correspond to about half the fold width, so that tongues can be bent over in different directions. Particularly preferably, the tongues are bent over alternately toward both sides of the packing element. The depth of the cuts is preferably from 3 to 8 mm. The angle which the bent-over tongues make with the packing element is preferably from about 110 to 150°, so that the tongues are roughly horizontally oriented in the packing layer. The lateral extension of the tongues is chosen so that from about 30 to 60% of the flow cross section is blocked. Preferably, only every second sequential packing element is bent over laterally in order to ensure sufficient mechanical stability of the packing layers stacked one above the other.

In a further preferred embodiment of the present invention in which the packing layer also has packing elements, strips preferably made of sheet metal are disposed between at least some of the packing elements. These are preferably made planar. The strips are preferably situated at the lower end of the packing layer. They can be disposed unilaterally or bilaterally on the packing elements and are preferably attached to these. Particularly preferably, the strips are attached to the packing elements by point welding. The strips preferably have a height of from about 15 to 25 mm. One end of the strips, preferably the upper end of the strips, is preferably bent over at the side by from about 2 to about 5 mm. This further advantageously increases the resistance to flow. The lateral bending of the strips is situated preferably between the folds of the packing elements. The lateral bending of the strips can take place during the assembly of the packing elements to form a packing layer.

The present invention comprises a further preferred embodiment in which the packing layer is composed of a combination of at least one first partial packing layer and one second partial packing layer, the first partial packing layer and the second partial packing layer differing from one another with respect to their internal geometries. In this case, in the first packing layer, the first partial packing layer is preferably disposed underneath the second partial packing layer. Particularly preferably, the first partial packing layer and the second partial packing layer are disposed directly one over the other, the first partial packing layer forming the lower partial packing layer and the second partial packing layer forming the upper partial packing layer. The partial packing layers are preferably designed so that their internal geometry does not vary over their height. The first, optionally lower, partial packing layer preferably has a height of from 0.02 to 0.10 m, and particularly preferably from 0.03 to 0.05 m. The second, optionally upper, partial packing layer preferably has a height of from 0.05 to 0.40 m, particularly preferably from 0.10 to 0.25 m. The resistance to flow of the first partial packing layer per meter height is preferably from about 1.2 to about 5 times, particularly preferably from about 1.5 to about 2.5 times, as high as the resistance to flow of the second partial packing layer. If the partial packing layers are composed of packing elements with folds, the resistance to flow of the partial packing layers can be set by the angle which the fold courses or tangents to the fold courses make with the longitudinal axis of the packing layer. The larger is this angle, the higher is the resistance to flow. In the context of the present invention an embodiment is preferred in which the partial packing layers are composed of packing elements with folds, the fold courses or tangents to the fold courses of the first partial packing layer being at a greater angle to the longitudinal axis of the packing layer than the fold courses or tangents to the fold courses of the second partial packing layer. Preferred angles have already been mentioned above, which are here incorporated by reference. The abovementioned first region of the packing layer corresponds in this case to the first partial packing layer mentioned here and the abovementioned second region of the packing layer corresponds to the second partial packing layer mentioned here. The resistance to flow of the partial packing layers can, furthermore, also be achieved by the size of the specific packing surface area per unit volume. Preferably, the partial packing layers have different specific surface areas per unit volume. Particularly preferably, the first, optionally lower, partial packing layer has a higher specific surface area per unit volume than the second, optionally upper, partial packing layer. In this case the specific surface area of the first, optionally lower, partial packing layer is preferably from 20 to 100%, particularly preferably from 30 to 60%, greater than that of the second, optionally upper, packing layer. In a particularly preferred embodiment, the first, optionally lower, partial packing layer is made of wire meshes. This makes it possible to set the liquid contents in a targeted manner by changing the heating power. The partial packing layers are preferably disposed twisted round from one another by from 45° to 90°.

The packing elements can have a thin coating of noble metal catalysts. This plays a role if, in a column having the inventive packing, in addition to the heat exchange and/or mass transfer, catalyzed reactions are also intended to proceed.

In the context of the present invention, therefore, furthermore, a process is provided for heat exchange and/or mass transfer between a liquid and a gas in a column, in which the liquid and the gas are conducted via an above-described structured packing, in particular in countercurrent flow, and the liquid and gas flow rates are set such that in a first, in particular lower, region of the packing layer, a bubbling layer having a predominantly disperse gas phase forms in a targeted manner and, simultaneously, in a second, in particular upper, region of the packing layer, a film flow of the liquid having a predominantly continuous gas phase forms in a targeted manner.

The column is preferably operated at a pressure drop of from about 5 to about 30 mbar, particularly preferably from about 8 to 12 mbar, per meter of packing height. The pressure drop can be set via the liquid and gas flow rates and by the heating power.

In a particular embodiment, superimposed on a separation by distillation, a chemical reaction proceeds in the column. It can be catalyzed homogeneously or heterogeneously or proceed spontaneously. The residence time of the liquid in the column can be set in a targeted manner by selecting the heating power with the differential pressure being measured.

Homogeneously catalyzed reactions can be, for example, acid catalyzed acetalizations, acetal cleavages, esterifications, saponifications and ether formations, and also alkoxide-catalyzed transesterifications. An example of a spontaneously proceeding reaction in a distillation column is the separation of formaldehyde from aqueous or alcoholic solutions.

It is also possible to coat the inventive structured packings with catalytically active material directly using processes which are already established in the art than to carry out heterogeneously catalyzed reactive distillations. If, for reasons of cost, only parts of the packings are to be coated with catalytically active material, it is expedient to coat preferably the first, optionally lower, region of the packing layer, in which predominantly the bubbling layer forms, since here particularly good mass transfer conditions occur.

The inventive packings are also suitable for reactive distillations in which the packings are coated with a thin layer of noble metal catalysts. In this case, partial hydrogenations can then be carried out in the presence of hydrogen. Particularly preferably, from a $C_4$ hydrocarbon mixture, components with triple bonds are highly selectively hydrogenated to form components with double bonds using the present process at a total pressure of from 3 to 8 bar, particularly preferably about 4 bar.

The present invention essentially has the following advantages:

The separation efficiency of the inventive structured packing is, when the described hydrodynamic state is established, up to 60% higher than the separation efficiency of structured packings according to the prior art. As a result, the required column height can be decreased and thus capital costs be saved.

The separation efficiency of the column is customarily characterized as a number of theoretical plates per meter of column height ($n_{th}$/m) or as height equivalent to a theoretical plate (HETP).

The inventive packings, due to the high liquid hold up in the packing, also open up other fields of application which have been reserved hitherto for plate columns or special constructions. Thus, some chemical reactions may be carried out particularly advantageously in columns which are equipped with the inventive structured packings.

The structured packing designed and operated according to the invention is a transition form between a packed column with a predominantly disperse liquid phase and a plate column with a predominantly continuous liquid phase. Favorable properties of a plate column (high mass transfer performance in the bubbling layer) and a packed column (prevention of drop entrainment and additional mass transfer at the packing surface) can thus be combined.

Other advantages, features and potential uses of the invention will now be described in detail on the basis of examples with reference to the accompanying drawing.

Figure 1:
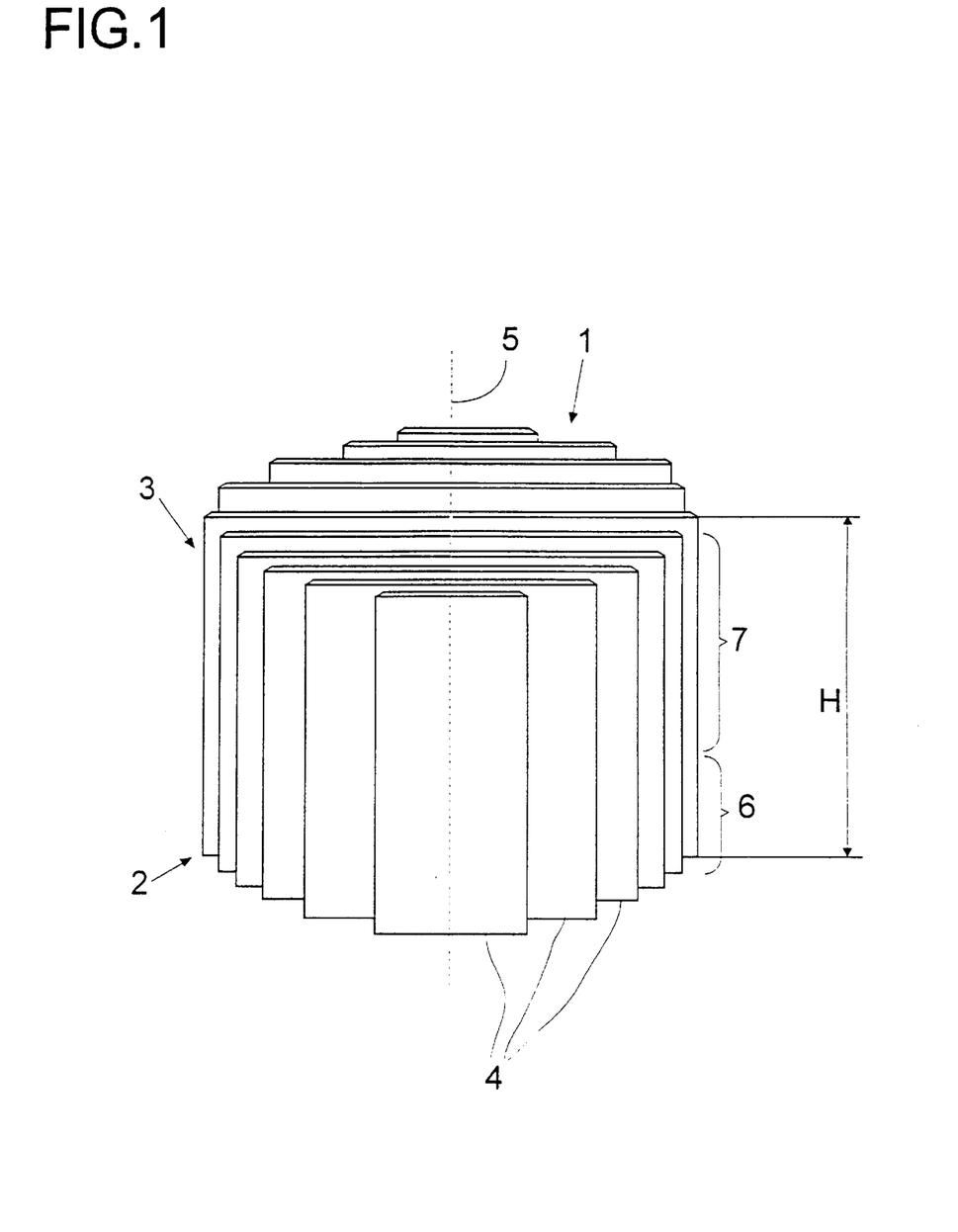
FIG. 1 shows a packing layer 1 of an embodiment of the structured packing

FIG. 1 shows a packing layer 1 of an embodiment of a structured packing according to the present invention. The packing layer 1 has a first, lower end 2 and a second, upper end 3. It has a height H of, for example, 0.2 m. The packing layer has contacting flat packing elements 4 made of metal sheets provided with folds (not shown). The reference number 5 shows the longitudinal axis of the packing layer 1. The packing layer 1, in addition, has a circular cross section. The internal geometry of the packing layer 1 varies over its height (not shown). The packing layer 1 has a first, lower region 6, whose internal geometry differs from a second, upper region 7. The first, lower region 6 of the packing layer 1 has a greater resistance to flow than the second, upper region 7. By suitable setting of the liquid and gas flow rates, a bubbling layer with a predominantly disperse gas phase forms in the first, lower region 6 of the packing layer 1 and simultaneously a film flow of the liquid with a predominantly continuous gas phase forms in the second, upper region 7 of the packing layer. The first, lower region 6 of the packing layer 1 and the second, upper region 7 of the packing layer 1 extend over the entire cross-sectional area of the packing layer 1. In addition, the first, lower region 6 is directly joined to the second, upper region 7. The second, upper region 7 of the packing layer 1 bounds the second, upper end 3 of the packing layer 1 and the first, lower region 6 bounds the first, lower end 2 of the packing layer 1.

Figure 2:
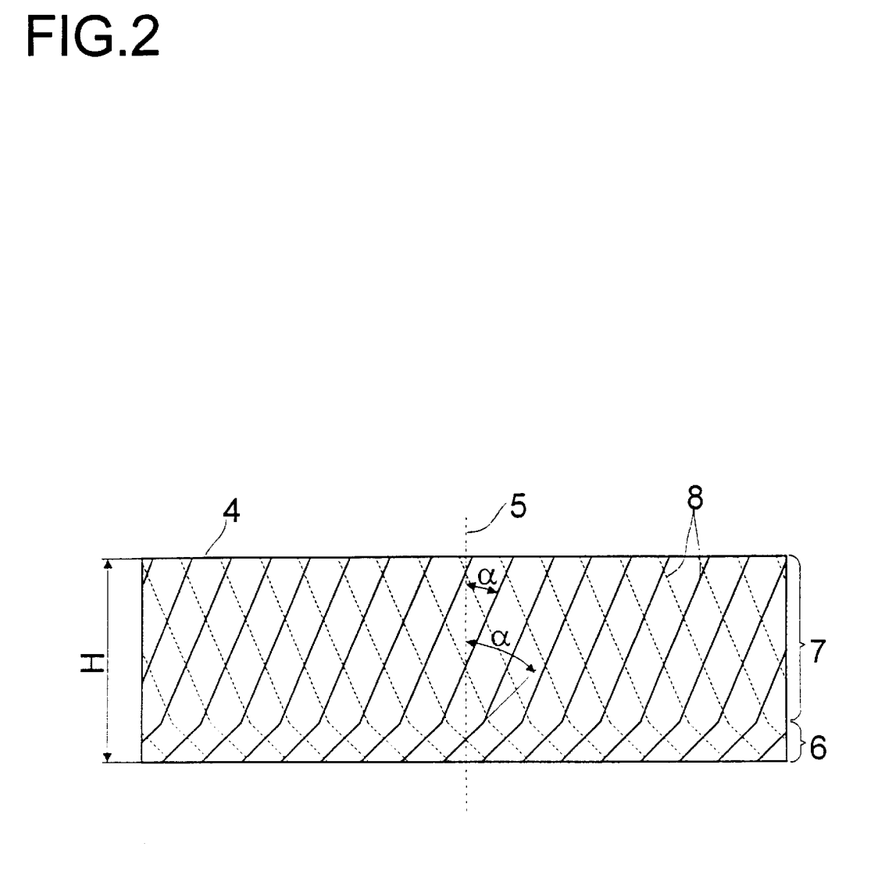
FIG. 2 shows serially arranged packing elements 4 of a packing layer 1 of a further embodiment of the structured packing
Figure 3:
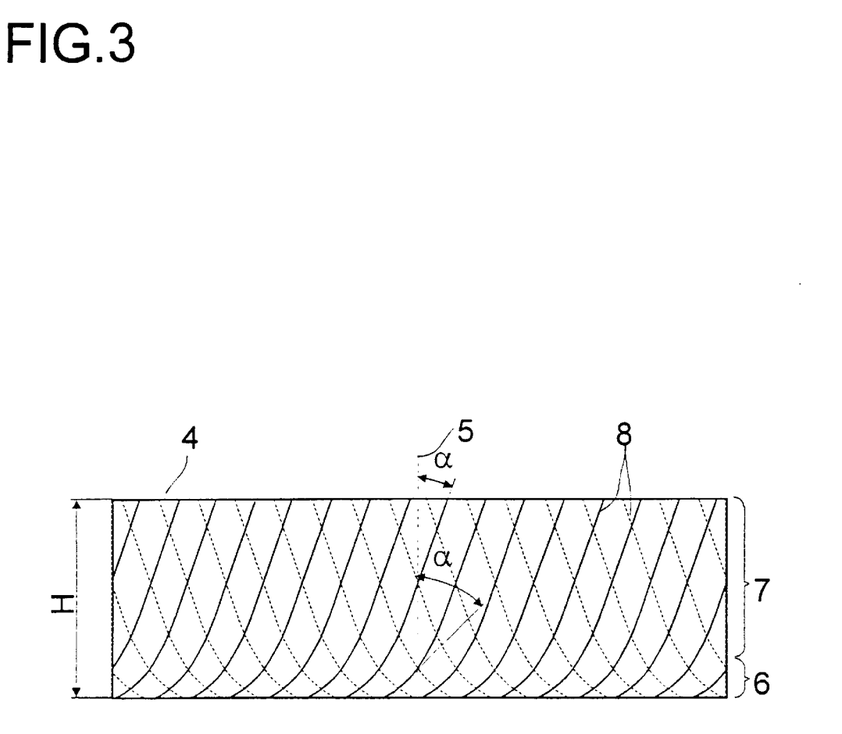
FIG. 3 shows serially arranged packing elements 4 of a packing layer 1 of a further embodiment of the structured packing

FIGS. 2 and 3 each show diagrammatically serially arranged packing elements 4 of a packing layer 1 of different embodiments of the structured packing according to the present invention. The continuous lines show the fold courses of the first, third, fifth etc. packing element 4 and the dashed lines show the fold courses of the second, fourth, sixth etc. packing element 4.

The packing elements 4 in FIG. 2 have the same height H of, for example 0.2 m, as the packing layer 1. The packing elements 4 consist of metal sheets with folds 8, as result of which the packing layer 1, which is made up of these packing elements, receives a cross-channel structure. The folds 8 have a linear course in sections. In the first, lower region 6 of the packing layer 1 the fold courses are at a larger angle to the longitudinal axis 5 of the packing layer 1 than in the second, upper region 7 of the packing layer 1. In the first, lower region 6 of the packing layer 1 the fold courses are at an angle of about 60° to the longitudinal axis 5 of the packing layer 1. In the second, upper region 7, the fold courses are at an angle of about 30° to the longitudinal axis 5 of the packing layer 1.

FIG. 3 shows diagrammatically packing elements 4 of a packing layer 1 of a further embodiment of the structured packing. The packing elements 4 have folds 8 with continuously curved fold courses. The packing elements 4 have the same height H, of for example 0.2 m, as the packing layer 1. The tangents to the fold courses are, in the first, lower region 6 of the packing layer 1 at a larger angle to the longitudinal axis 5 of the packing layer 1 than in the second, upper region 7 of the packing layer 1. In the first, lower region 6 of the packing layer 1 the tangents to the fold courses are at an angle of from about 45° to about 75° to the longitudinal axis 5 of the packing layer 1. In the second, upper region 7, the tangents to the fold courses are at an angle of from about 10° to about 45° to the longitudinal axis 5 of the packing layer. The folds 8 have an approximately parabolic course.

Figure 4:
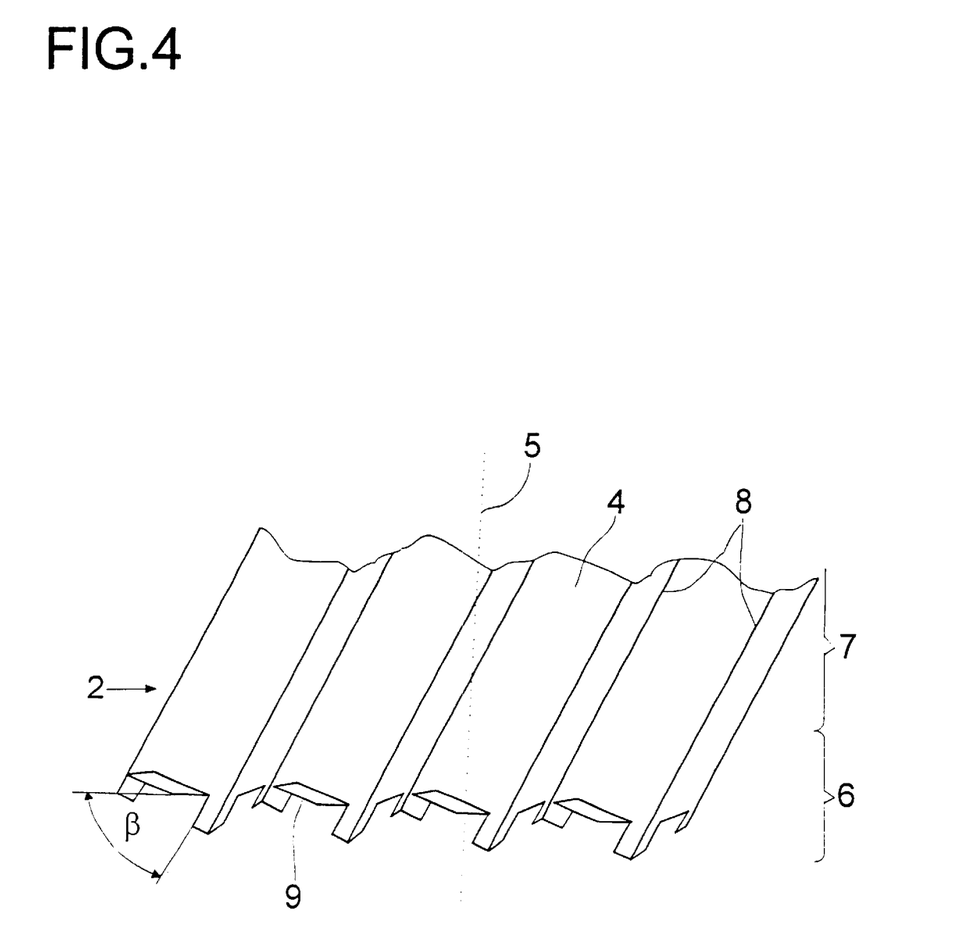
FIG. 4 shows a section of a packing element 4 of a packing layer 1 of an embodiment of a structured packing having laterally bent-over packing elements 4 in a three-dimensional view

FIG. 4 shows, in three-dimensional view, a detail of a packing element 4 of a further embodiment of the inventive packing. The packing element 4, in the detail shown, has folds 8 with a linear course. The reference number 5 denotes the longitudinal axis of the packing layer 1 in which the packing element 4 is disposed. At the first, lower end 2 of the packing layer 1, at distances which correspond to roughly half the fold width, cuts which are from about 3 to 8 mm wide are introduced into the packing element 4 and tongues 9 are alternately bent over toward both sides so that they are at an angle of from 110° to 150° to the packing element, so that the tongues are roughly horizontally oriented in the packing layer. The lateral extension of the tongues is chosen so that from about 30 to 60% of the flow cross section is blocked.

Figure 5:
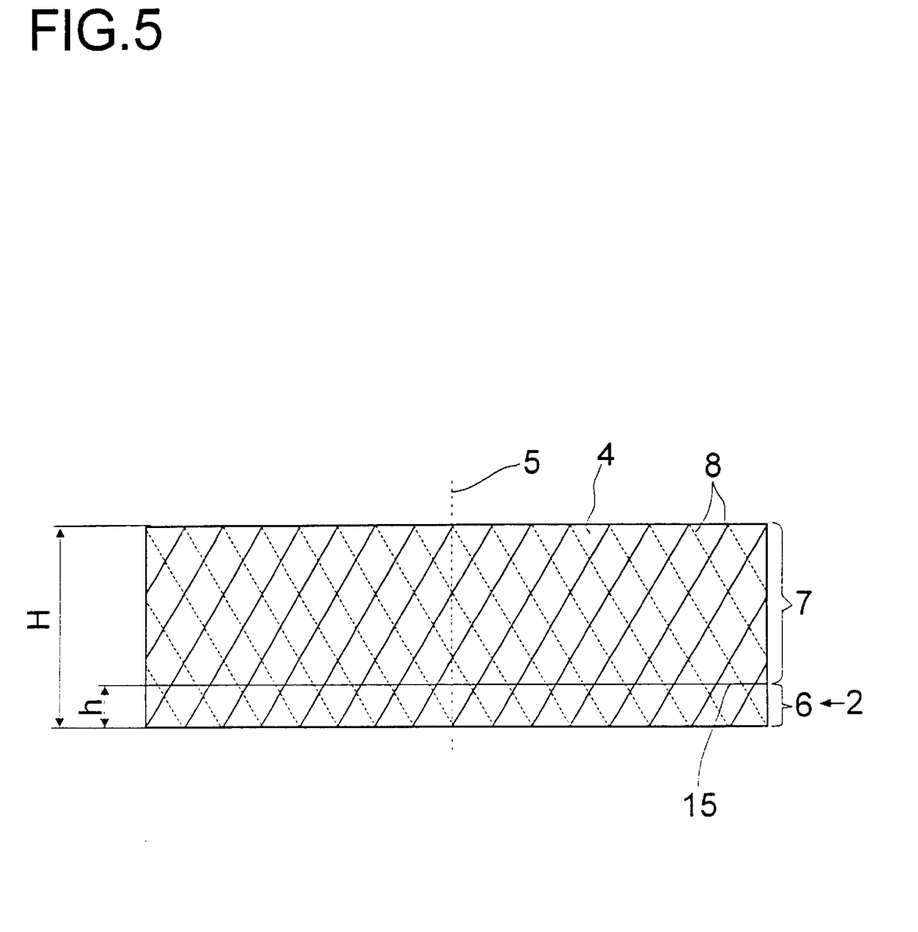
FIG. 5 shows serially arranged packing elements 4 of a packing layer 1 of a further embodiment of the structured packing with thin strips 15 between the packing elements 4

FIG. 5 shows serially arranged packing elements 4 of a packing layer 1 in a further embodiment of the structured packing. The continuous lines show the fold courses of the first, third, fifth etc. packing element 4 and the dashed lines show the fold courses of the second, fourth, etc. packing element 4. The packing elements 4 have the same height H, of for example 0.2 m, as the packing layer 1. The packing elements 4 have linear folds 8. The reference number 5 designates the longitudinal axis of the packing layer 1. At the first, lower end 2 of the packing layer 1, thin metal sheet strips IS are disposed between the packing elements 4. The metal sheet strips are joined directly to the lower end 2 of the packing layer 1. The strips are planar and preferably have a height h of from about 15 to 25 mm.

Figure 6:
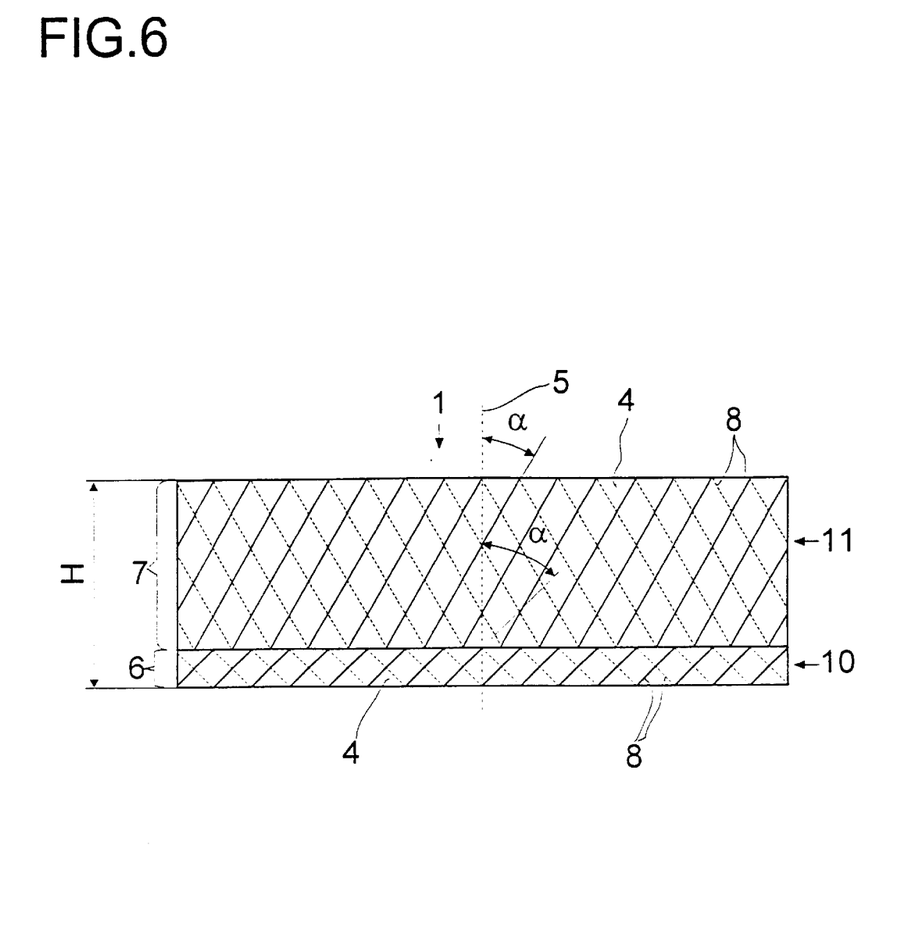
FIG. 6 shows a further embodiment of the structured packing having a packing layer 1 which is formed from two partial packing layers of different internal geometry

FIG. 6 shows in longitudinal section a packing layer 1 of an embodiment of the inventive structured packing. The packing layer 1 consists of two partial packing layers arranged one above the other, a first partial packing layer 10 and a second partial packing layer 11. Both partial packing layers 10, 11 together form the height H of the packing layer 1. The first partial packing layer 10 forms the lower partial packing layer and the second partial packing layer 11 forms the upper partial packing layer. The first partial packing layer 10 forms the first, lower region 6 of the packing layer 1, and the second partial packing layer 11 forms the second, upper region 7 of the packing layer 1. Both partial packing layers consist of a plurality of packing elements 4 which are arranged next to one another or serially.

The packing elements 4 of the partial packing layers 10, 11 consist of metal sheet and have folds which run linearly. The continuous lines show the fold courses of the first, third, fifth etc. packing element 4 and the dashed lines show the fold courses of the second, fourth, sixth etc. packing element 4. The fold courses are at an angle to the longitudinal axis 5 of the packing layer 1 in the first partial packing layer 10 which is larger than the angle which the fold courses in the second partial packing layer 11 are at to the longitudinal axis 5. In the first partial packing layer 10, the fold courses are at an angle of about 60° to the longitudinal axis of the packing layer 1. In the second partial packing layer 11 the fold courses are at an angle of about 30° to the longitudinal axis of the packing layer 1. The first partial packing layer 10 as result has a greater resistance to flow than the second partial packing layer 11. The first partial packing layer 10 preferably has a height of from 0.02 to 0.10 m, particularly preferably from 0.03 to 0.05 m.

Figure 7:
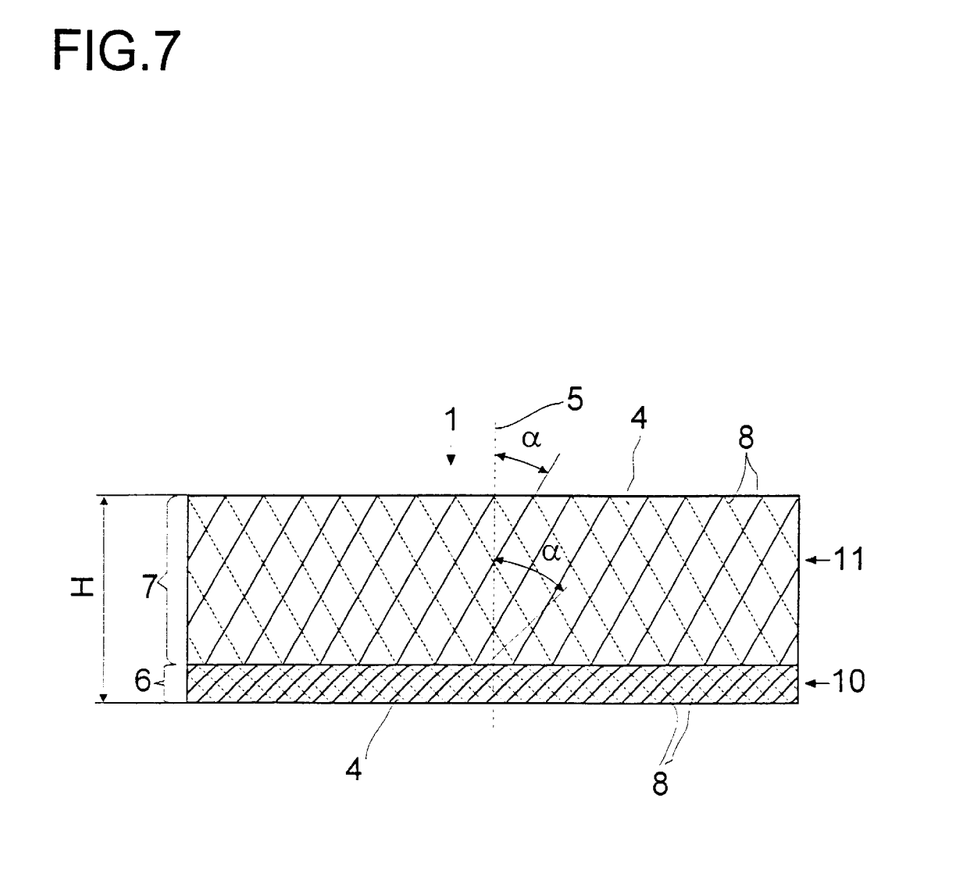
FIG. 7 shows a further embodiment of the structured packing having a packing layer 1 which is formed of two partial packing layers of different internal geometry.

FIG. 7 shows, as does FIG. 6, an embodiment of the inventive structured packing in longitudinal section, with a packing layer 1 which consists of two partial packing layers 10, 11. The two embodiments of FIGS. 6 and 7 essentially agree. The same reference numbers designate the same parts. Reference is thus made to the comments on FIG. 6. In contrast to the embodiment in FIG. 6, the fold courses of the present embodiment of FIG. 7 are at the same angle to the longitudinal axis 5 of the packing layer 1 in the first and second partial packing layers 10, 11. However, the lower partial packing layer 10 has a specific surface area which is greater by 50% than that of the upper partial packing layer 11. As a result the resistance to flow is greater in the first, lower partial packing layer 10 than in the second, upper partial packing layer 11.

By suitably setting the liquid and gas flow rates, in all of the embodiments of the inventive structured packing described in FIGS. 1 to 7, a bubbling layer having a predominantly disperse gas phase forms in a targeted manner in the first, lower region 6 of the packing layer 1 and, simultaneously, a film flow of the liquid having predominantly a continuous gas phase forms in a targeted manner in the second, upper region 7 of the packing layer 1.

EXAMPLES

In the examples below the differential pressure or pressure drop $\Delta p$ was measured in mbar/m. The F factor served as an index of the gas load in the column or packing. This is defined as the product of the gas velocity $w_G$[m/sec] and the square root of the gas density $\rho_G$ [kg/m$^3$]: $F=w_G \cdot \sqrt{\rho_G}$. The dynamic holdup hp [$m^3/m^3$] is defined as the liquid volume [$m^3$] in the column based on the empty column volume [$m^3$]. The separation efficiency of the column was defined as the number of theoretical plates per meter of column height or packing height ($n_{th}$/m).

COMPARATIVE EXAMPLE

The experimental column used was a glass column having an internal diameter of 0.1 m. It was packed over a height of about 0.8 m with 4 packing layers of a structured sheet packing in cross-channel structure having a specific surface area of 250 $m^2/m^3$ (of type Montz B1-250). The structured packing therefore corresponded to a structured packing of the prior art. The packing layers of this structured packing had packing elements with linearly running folds. The fold courses were at an angle of 45° to the longitudinal axis of the packing layer or of the longitudinal axis of the column. The packing elements had circular perforations. The test mixture was the air/water system. The column was operated at a pressure of 1 bar and a temperature of about 25° C. A liquid flow of 100 l/h was applied to the top of the column. The air flow added at the lower end of the column was varied so as to give F factors from 0.7 to 3.3 $Pa^{0.5}$.

Figure 8:
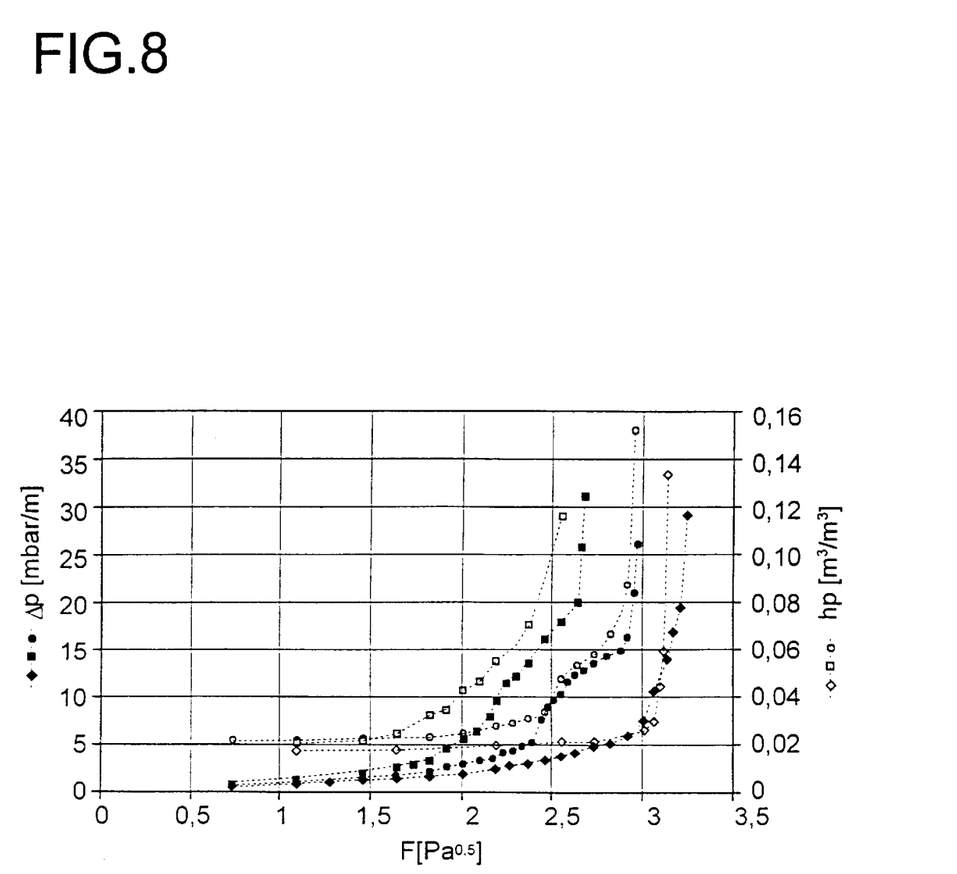
FIGS. 8 shows the differential pressure or pressure drop Δp and the dynamic holdup hp of the structured packing for various experimental arrangements and operating conditions.

The differential pressure $\Delta p$ and the dynamic holdup hp of the structured packing were measured. The results of the measurements are shown in FIG. 8 as diamonds. A filled diamond represents the pressure drop $\Delta p$, an open diamond represents the holdup hp.

The dynamic holdup at F factors <3 $Pa^{0.5}$ was only about 2%. This increased abruptly when the F factor was further increased by less than 10% and led to flooding of the entire packing. Because of this behavior it was not possible to set in a targeted manner a dynamic holdup hp of more than 2%. The pressure drop $\Delta p$, at elevated F factors, also showed a very rapid increase.

Example 1

The experimental arrangement and operating conditions corresponded to those of the comparative example. In contrast to the comparative example, however, the column was packed with an embodiment of a structured packing according to the present invention. This consisted of three packing layers which were each composed of a first, lower partial packing layer and a second, upper partial packing layer. The first, lower partial packing layer was a structured sheet packing in cross-channel structure having a specific surface area of 250 $m^2/m^3$ and a height of 0.20 m (of type Montz B1-250), as already used in the comparative example. In this context, reference is made to the comments on the comparative example. The second, upper partial packing layer was a structured sheet metal packing having a specific surface area of 500 $m^2/m^3$ having a height of 0.03 m (of type Montz B1-500). This sheet metal packing had packing elements with linear folds whose fold courses were at an angle of 45° to the longitudinal axis of the packing layer.

The packing elements had circular perforations. The height H of a packing layer was 0.23 m. The three packing layers were arranged one above the other in the column.

Correspondingly to the comparative example, the differential pressure or pressure drop $\Delta p$ and the dynamic holdup hp of the structured packing were measured. The results of the measurements are shown in FIG. 8 as squares. A filled square represents the pressure drop $\Delta p$, an open square represents the holdup hp.

The dynamic holdup hp was increased evenly from 2% to 8% by increasing the F factor from 0.5 to 2.5. The pressure drop correlated well with the holdup hp. By choosing the pressure drop, a desired value of holdup hp may be set.

Example 2

The experimental arrangement and the operating conditions corresponded to those of the comparative example or Example 1. The column was packed with an embodiment of a structured packing according to the present invention, the structured packing essentially matching that in Example 1. The structured packing again consisted of three packing layers which were each composed of a first, lower partial packing layer and of a second, upper partial packing layer. The first, lower partial packing layer corresponded to that in Example 1 or that in the sheet metal packing used in the comparative example. To this extent reference is made to the above comments. The second, upper partial packing layer consisted, however, in contrast to Example 1, of a mesh packing having a specific surface area of 500 $m^2/m^3$ (of type Montz A3-500). This mesh packing had packing elements with linearly running folds, whose fold courses were at an angle of 30° to the longitudinal axis of the packing layer. The packing elements had circular perforations. The height of the second, upper partial packing layer was, as in Example 1, 0.03 m. The height of a packing layer was therefore, as in Example 1, 0.23 m.

In accordance with the comparative example and Example 1, the differential pressure or pressure drop $\Delta p$ and the dynamic holdup hp were measured. The results of the measurements are shown as circles in FIG. 8. A filled circle represents the pressure drop $\Delta p$, an open circle represents the holdup hp.

The dynamic holdup was increased evenly from 2% to 10% by increasing the F factor from 2.0 to 3.0. In this case also, the pressure drop correlated well with the holdup hp and permitted a desired holdup to be set in a targeted manner.

Example 3

In an experimental column having a diameter of 0.1 m, distillation experiments were carried out using a test mixture of isobutanol and n-butanol at a pressure of 1 bar. The column was packed with an embodiment of a structured packing which corresponded to that of Example 2.

Figure 9:
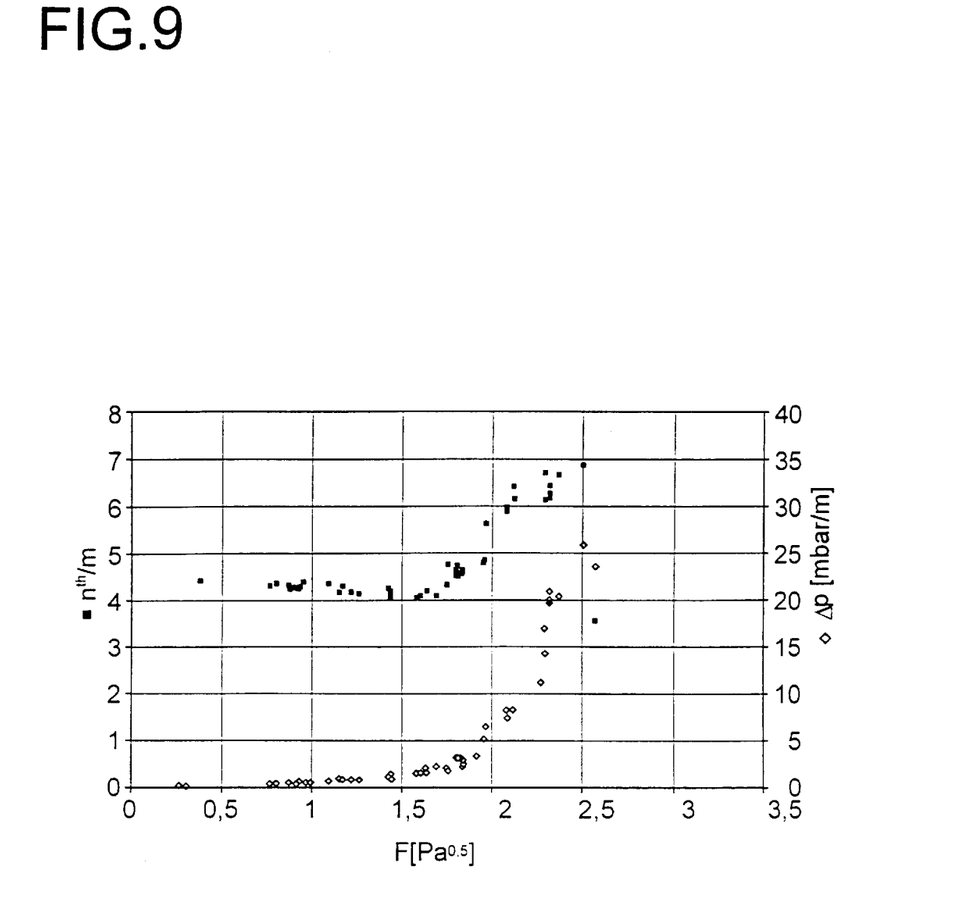
FIGS. 9 and 10 show the differential pressure drop Δp and the number of theoretical plates $n_{th}$ per meter (m) of packing/column height for various experimental arrangements and operating conditions.

The differential pressure or pressure drop $\Delta p$ and the number of theoretical plates $n_{th}$ per meter [m] of packing/column height were measured. The results of the measurements are shown in FIG. 9. A filled square is the number of theoretical plates $n_{th}$ per meter [m], an empty diamond represents the pressure drop $\Delta p$.

By targeted stemming of the liquid over a broad industrially usable range, the number of theoretical plates $n_{th}$ per meter was increased by about 50%. The desired advantageous operating states were controlled precisely via the differential pressure or pressure drop $\Delta p$.

Example 4

The experimental arrangement, the structured packing and the test mixture corresponded to those of Example 3. However, the operating pressure of the column was only 0.2 bar.

Figure 10:
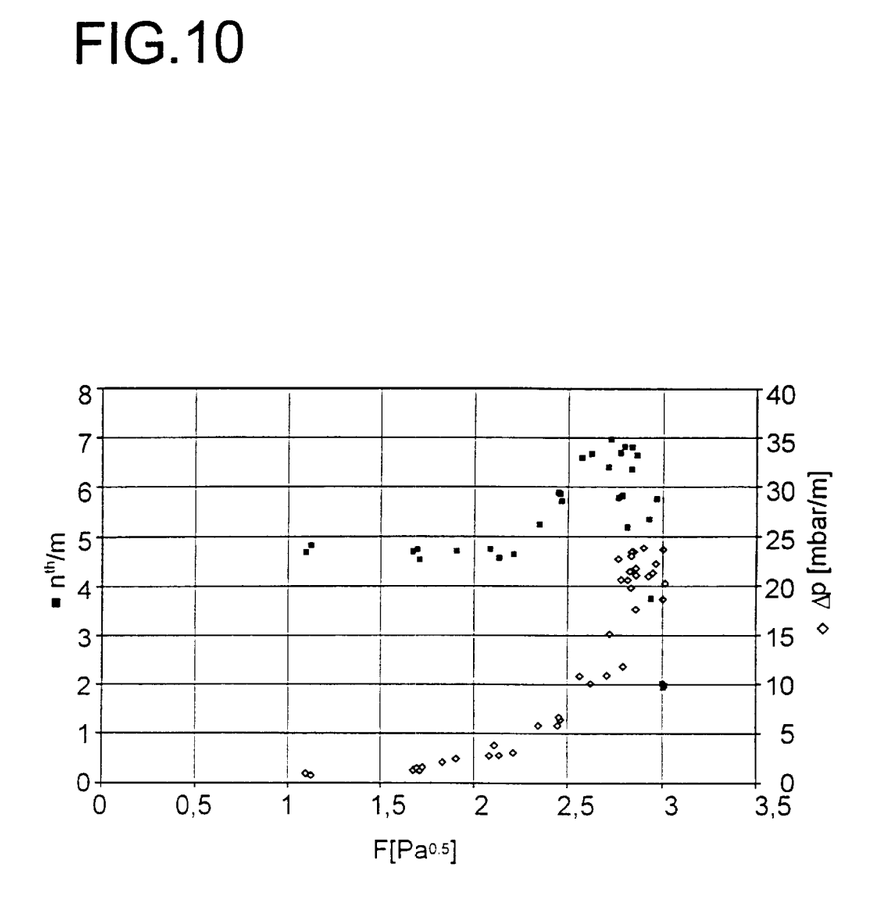

As in Example 3, the differential pressure or pressure drop $\Delta p$ and the number of theoretical plates $n_{th}$ per meter [m] of column/packing height were measured. The results of the measurements are shown in FIG. 10. A filled square represents the number of theoretical plates $n_{th}$ per meter, an empty diamond represents the pressure drop $\Delta p$.

In this example also, by targeted stemming of the liquid, the number of theoretical plates per meter [m] of column/packing height was increased by about 50%. Measuring the differential pressure Δp in this case also made exact control of the desired operating state possible.

We claim:

1. A structured packing for heat exchange and/or mass transfer between a liquid and a gas in a column having at least one packing layer with a first, lower end and a second, upper end, the packing layer having an internal geometry which varies over its height from a first region of the packing layer to a second region of the packing layer wherein the packing layer has touching flat packing elements having folds of defined courses, the fold courses or tangents to the fold courses being at a larger angle to the longitudinal axis of the packing layer in the first region of the packing layer than in the second region of the packing layer and wherein the fold courses or tangents to the fold courses of the packing elements are at an angle of from about 45° to about 75° to the longitudinal axis of the packing layer in the first region of the packing layer and from about 10° to about 45° in the second region.

2. A structured packing as claimed in claim 1, in which the packing layer has a resistance to flow which varies over its height.

3. A structured packing as claimed in claim 1, in which the first region of the packing layer has a higher resistance to flow than the second region of the packing layer.

4. A structured packing as claimed in claim 1, in which the folds of the packing elements have, at least in sections, a continuous course.

5. A structured packing as claimed in claim 1, in which the packing layer has packing elements, with at least some of the packing elements being bent over in a tongue-like manner at the lower end and/or upper end of the packing layer.

6. A structured packing as claimed in claim 1, in which the packing layer has packing elements, thin strips being arranged unilaterally or bilaterally between at least some of the packing elements.

7. A structured packing as claimed in claim 1, wherein the first region is at least one first partial packing layer and the second region is at least one second partial packing layer, the first partial packing layer and the second partial packing layer differing with respect to their internal geometries.

8. A process for heat exchange and/or mass transfer between a liquid and a gas in a column, in which the liquid and the gas are conducted via the structured packing as claimed in claim 1, and the liquid and gas flow rates are set such that in the first region of the packing layer a bubbling layer having a predominantly disperse gas phase forms in a targeted manner and, simultaneously, in the second region of the packing layer, a film flow of the liquid having a predominantly continuous gas phase forms in a targeted manner.

9. A process as claimed in claim 8, in which residence time of the liquid in the column is set in a targeted manner by selecting heating power with differential pressure being measured.

10. A structured packing as claimed in claim 1, in which the first region of the packing layer is lower than the second region of the packing layer.

11. A structured packing as claimed in claim 1, in which the touching flat packing elements are metal sheets, expanded metals, wire fabrics or knitted meshes.

12. A structured packing as claimed in claim 6, in which the thin strips are made of sheet metal.

13. A structured packing as claimed in claim 6, in which the strips are situated at the lower end of the packing layer.

14. A process as claimed in claim 8, in which the liquid and the gas are in countercurrent flow.

15. A process as claimed in claim 8, in which the first region of the packing layer is lower than the second region of the packing layer.

* * * * *